United States Patent
Iino

(10) Patent No.: US 6,857,592 B2
(45) Date of Patent: Feb. 22, 2005

(54) RECORDING TAPE CARTRIDGE

(75) Inventor: Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 6 days.

(21) Appl. No.: 10/650,805

(22) Filed: Aug. 29, 2003

(65) Prior Publication Data

US 2004/0041053 A1 Mar. 4, 2004

(30) Foreign Application Priority Data

Aug. 30, 2002 (JP) .................................... 2002-255106

(51) Int. Cl.[7] ............................................ G11B 23/107
(52) U.S. Cl. ..................... 242/348; 242/348.2; 360/132
(58) Field of Search ................................. 242/345, 348, 242/348.2; 360/132

(56) References Cited

U.S. PATENT DOCUMENTS 6,271,991 B1    8/2001  Saliba et al.

Primary Examiner—John Q. Nguyen
(74) Attorney, Agent, or Firm—Sughrue Mion, PLLC

(57) ABSTRACT

A recording tape cartridge of the invention houses a reel inside a case formed by joining together an upper case and a lower case. The reel includes a reel hub around which is wound a recording tape, with flanges being disposed at both axial-direction end portions of the reel hub. Movement of the reel in the axial (vertical) direction inside the case is possible. Upper ribs are disposed, in a radial manner coaxial with the reel and at equal intervals, so as to vertically project from an inner surface of the upper case opposing the flange of the upper case. The upper ribs are disposed, in a radial shape coaxial with the reel and at equal intervals, so as to vertically project from an inner surface of the lower case. The upper ribs and the lower ribs are disposed so as to have a phase difference therebetween in a circumferential direction.

19 Claims, 6 Drawing Sheets

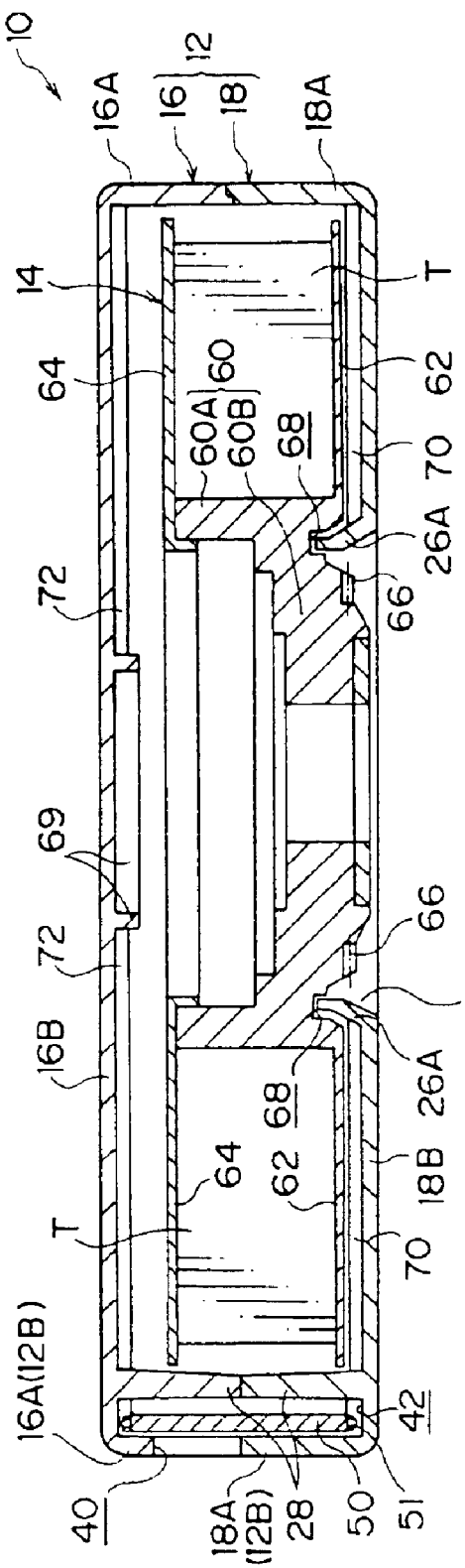
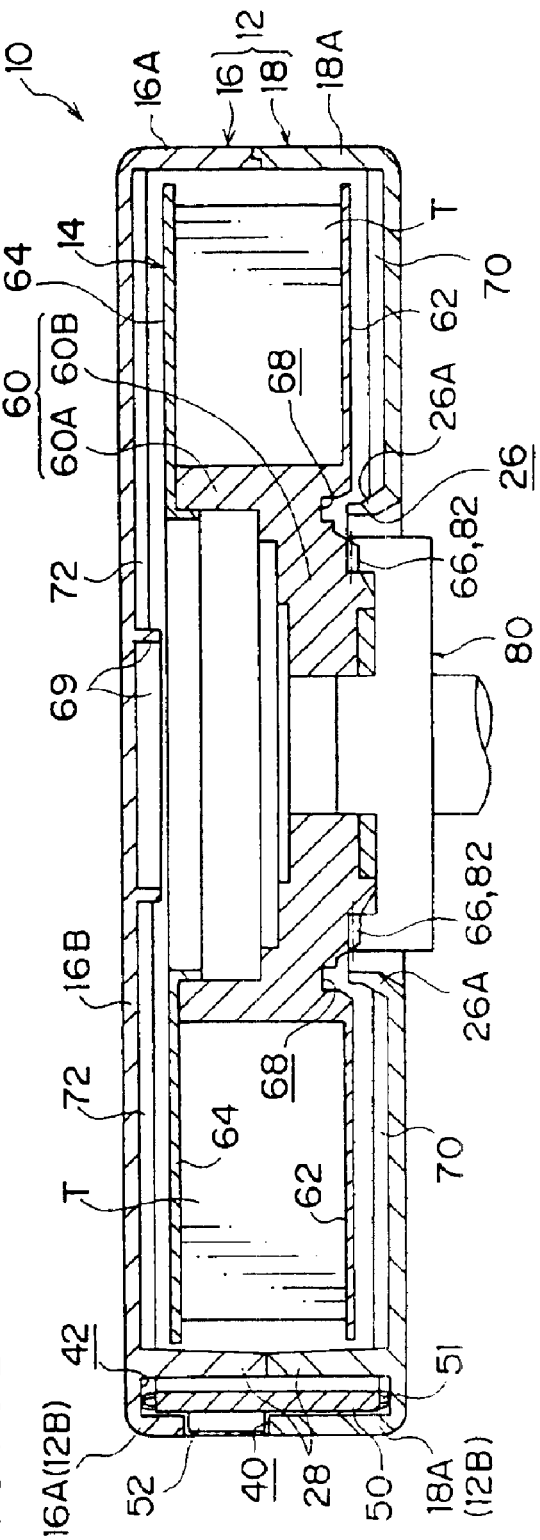
FIG. 6A
FIG. 6B

RECORDING TAPE CARTRIDGE

CROSS-REFERENCE TO RELATED APPLICATION

This application claims priority under 35 USC 119 from Japanese patent application, No. 2002-255106, the disclosure of which is incorporated by reference herein.

BACKGROUND OF THE INVENTION

1. Field of the Invention

The present invention relates to a recording tape cartridge rotatably housing a reel wound with a recording tape such as a magnetic tape.

2. Description of the Related Art

A recording tape such as a magnetic tape is used as an external recording medium for computers and the like. For the recording tape, a so-called single reel recording tape cartridge—whose housing space at the time of storage is small, in which a large amount of information can be recorded, and in which a single reel wound with a recording tape is rotatably housed inside a case—has been adopted.

In such a recording tape cartridge, a reel in which flanges are respectively disposed at both axial-direction ends of a reel hub wound with the recording tape is housed in a case formed by an upper case and a lower case being joined together so that mutual peripheral walls of the upper case and the lower case come into contact each other. When the recording tape cartridge is not in use, the reel housed in the case is in a state where the reel is pushed against the lower case by an urging force of a coil spring or the like. A gear opening for exposing a reel gear formed at an axial-direction lower end surface of the reel is disposed in the lower case.

When the recording tape cartridge is to be used, the recording tape cartridge is loaded into a drive device. A drive gear of the drive device meshes with the reel gear and causes the reel to rise inside the case counter to the urging force. The drive gear is then rotatingly driven, whereby the reel is made to rotate without contacting inner surfaces of the case. Thus, information can be recorded on the recording tape or played back by taking up or rewinding the recording tape through an opening in the case for pulling out the recording tape.

However, in the above-described conventional recording tape cartridge, it is possible for the reel to vertically move (rise and fall) inside the case. Thus, for example, there has been the problem that the reel ends up being inclined inside the case when a user mistakenly pushes the exposed reel gear or drops the recording tape cartridge.

In this instance, when the space inside the case is large in the vertical direction, the inclination (angle of inclination) of the reel becomes large. In a single reel recording tape cartridge, such a large inclination of the reel results in relative movement between the recording tape and the reel because a leader member disposed at an end portion of the recording tape is fixedly positioned inside the case in the not-in-use state. Thus, there is the potential for width-direction end portions (edges) of the recording tape to contact the flanges of the reel and sustain damage. The same problem occurs even in two-reel recording tape cartridges.

Although it is conceivable to thin the thickness of the case as a countermeasure therefor, this is unrealistic because the thickness of the case is determined on the basis of the specification and the demand from the drive device. Alternatively, if the thickness of the case is thickened in order to narrow the vertical dimension of the interior space, the moldability of the case, which is usually formed by resin molding, deteriorates and this deterioration leads to an inferior appearance. Additionally, thickening the thickness of the case results in an increase in the amount of resin used, an increase in the weight of the case, and an increase in costs.

Thus, in order to suppress inclination of the reel, disposing ribs that partially project from the inner surfaces of the case has been considered. For example, a configuration in which plural ribs are disposed in a radial manner at an inner surface of a lower case configuring a case is described in Japanese Patent Application Laid-open Publication (JP-A) No. 9-45034, even though this configuration relates to a two-reel recording tape cartridge. However, the ribs disclosed in this publication are for reducing the amount that the reel rises with respect to the lower case. Because the ribs are not disposed at the upper case, the effect with respect to suppressing inclination of the reel is small.

Configurations in which annular or arced ribs coaxial with the reel are respectively disposed at the upper and lower cases, and configurations in which plural ribs that differ in number between the upper and lower cases are respectively disposed in a radial manner, are being adopted in actual products. However, none of these configurations can effectively regulate inclination of the reel.

Thus, in the field of recording tape cartridges, there is room for improvement in relation to ribs for suppressing inclination of the reel, and particularly in relation to the disposition of the ribs.

In consideration of the above-described facts, it is an object of the present invention to obtain a recording tape cartridge that can suppress inclination of a reel, with ribs vertically disposed inside a case.

SUMMARY OF THE INVENTION

In order to achieve the above object, a first aspect of the invention is a recording tape cartridge comprising: a case formed by joining together an upper case and a lower case; a reel that includes flanges respectively disposed at both axial-direction end portions of a reel hub wound with a recording tape, the reel being housed in the case and rising and being rotated inside the case when the recording tape cartridge is used; plural upper ribs disposed, in a radial manner coaxial with the flanges and at substantially equal intervals, so as to vertically project from a surface of the upper case opposing the flanges; and lower ribs disposed, in a radial manner coaxial with the flanges and at substantially equal intervals, so as to vertically project from a surface of the lower case opposing the flanges, with the number of lower ribs being equal to the number of upper ribs, wherein, when the upper case and the lower case are joined together, the upper ribs and the lower ribs have a mutual phase difference therebetween in a circumferential direction.

In the recording tape cartridge pertaining to the invention, when the cartridge is in use, the reel is rotated without contacting inner surfaces of the case in a state where the reel has risen inside the case, and the magnetic tape is taken up or rewound with respect to the reel. That is, at this time, the reel is movable in an axial direction (vertical direction) inside the case. Thus, when the reel becomes inclined inside the case due to impact when the recording tape cartridge is dropped or the like, the reel abuts against the upper ribs and the lower ribs disposed so as to vertically project from respective surfaces of the upper case and the lower case opposing the flanges.

Here, because the same number of upper ribs and lower ribs is disposed in a radial manner coaxial the flanges (reel) and so that they have a mutual phase difference therebetween in the circumferential direction when the upper case and the lower case are joined together, inclination (angle of inclination) of the reel, in which one radial-direction end approaches an inner surface of the upper case and the other end approaches an inner surface of the lower case, can be effectively suppressed at a small value.

That is, in a configuration where upper ribs and lower ribs, which are disposed in the same numbers at substantially equal intervals in a radial manner, oppose each other, one of outer edge portions of flanges enters between a pair of adjacent lower ribs and the other of outer edge portions of flanges enters between a pair of adjacent upper ribs positioned at substantially opposite side, in the radial direction, of the pair of adjacent lower ribs, whereby it is easy for the angle of inclination to become large. However, in the present configuration where the upper ribs are positioned between adjacent lower ribs in plan view, the amount that one of the outer edge portions of the flanges enters between a pair of adjacent lower ribs is regulated by the upper ribs at the opposite side in the radial direction. In other words, because the present configuration is substantially equivalent to a configuration where opposite-side ribs are added between adjacent lower ribs or adjacent upper ribs, the angle of inclination of the reel can be suppressed by the upper ribs and the lower ribs.

Therefore, according to the recording tape cartridge of this aspect, inclination of the reel can be suppressed by the ribs vertically disposed inside the case. Conversely, it is also possible to maintain an allowable inclination of the reel and reduce number of disposed ribs.

In a second aspect of the invention, the phase difference in the recording tape cartridge of the first aspect is half an angle formed between adjacent lower ribs.

In the recording tape cartridge of this aspect, because the phase difference between the upper ribs and the lower ribs is half the angle formed between adjacent lower ribs (i.e., adjacent upper ribs) (=/2), inclination (angle of the inclination) of the reel can be more effectively suppressed.

That is, according to this configuration, the recording tape cartridge is configured to be substantially equivalent to a configuration where (upper/lower) opposite-side ribs are further added between adjacent lower ribs/upper ribs when a reel is inclined in a state where different end portions in the radial direction approach different upper and lower inner surfaces, respectively. As a result, regardless of the direction of inclination of the reel, the angle of inclination of the reel can be even more effectively suppressed.

In a third aspect of the invention, the number of upper ribs and the number of lower ribs in the recording tape cartridge of the second aspect are even numbers.

In the recording tape cartridge of this aspect, the respective numbers of upper ribs and lower ribs disposed in the radial manner, at substantially equal intervals and with the phase difference are even numbers. Thus, an upper rib is always positioned at the 180° opposite side of a midpoint between a corresponding pair of adjacent lower ribs, and the lower ribs are positioned at the 180° opposite side between adjacent upper ribs. Therefore, regardless of the direction of inclination of the reel, inclination (angle of inclination) of the reel can be even more effectively suppressed at a small value.

BRIEF DESCRIPTION OF THE DRAWINGS

FIG. 6A is a cross-sectional view showing a state where a reel has been positioned with respect to a case; and FIG. 6B is a cross-sectional view showing a state where the reel is rotated inside the case.

DETAILED DESCRIPTION OF THE INVENTION

A recording tape cartridge 10 pertaining to an embodiment of the invention will be described on the basis of FIGS. 1 to 6B. First, the schematic overall configuration of the recording tape cartridge 10 and the configuration of an opening and a door will be described, and then a reel 14 and ribs for suppressing inclination of the reel 14, which are main parts of the invention, will be described. For convenience of explanation, the direction in which the recording tape cartridge 10 is loaded into a drive device will be represented by arrow A and referred to as the front direction (front side) of the recording tape cartridge 10. The direction of arrow B, which is orthogonal to the direction of arrow A, will be referred to as the right direction.

(Overall Configuration of the Recording Tape Cartridge)

Figure 1:
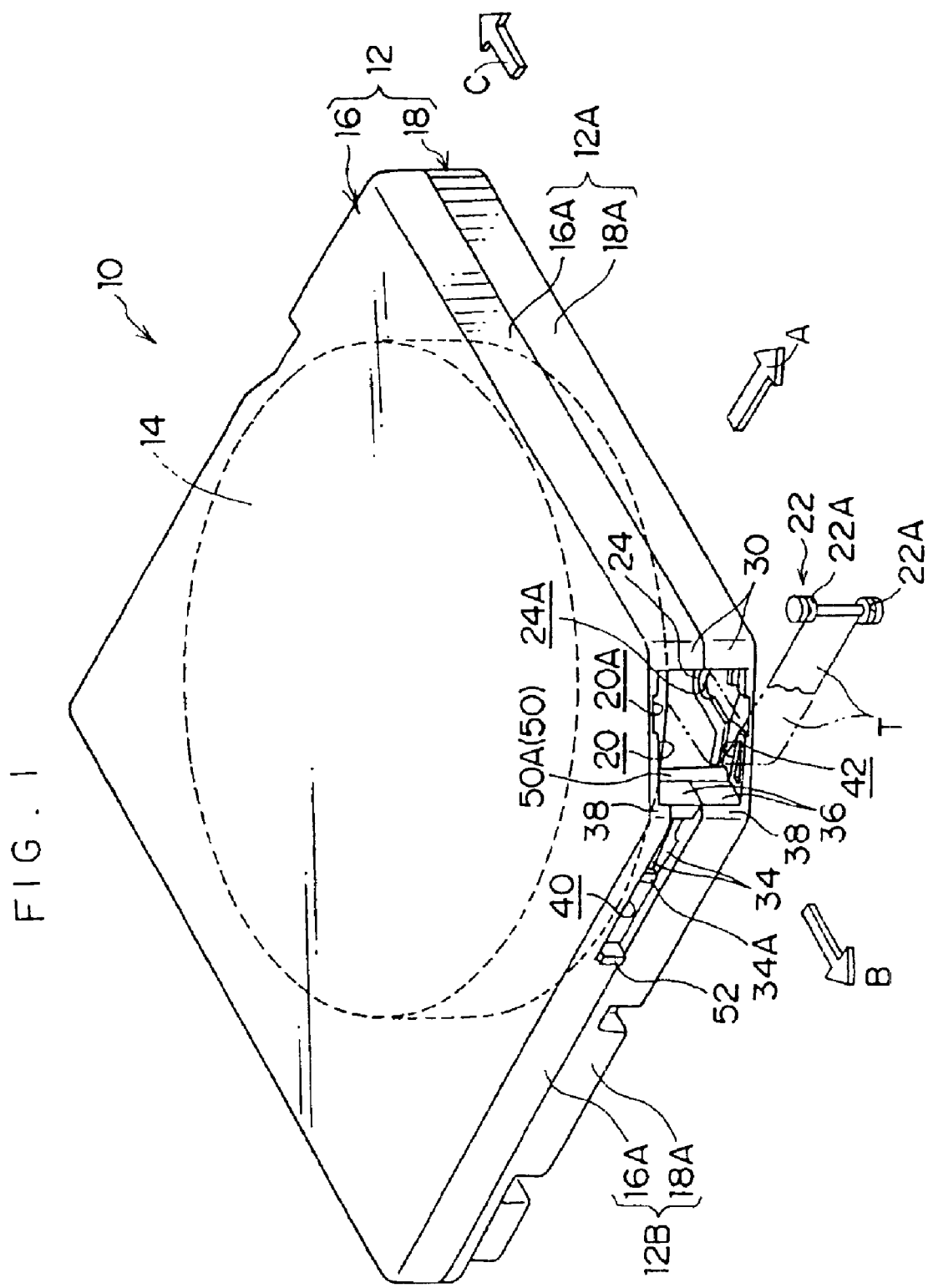
FIG. 1 is a perspective view showing the overall configuration of a recording tape cartridge pertaining to an embodiment of the invention.
Figure 2:
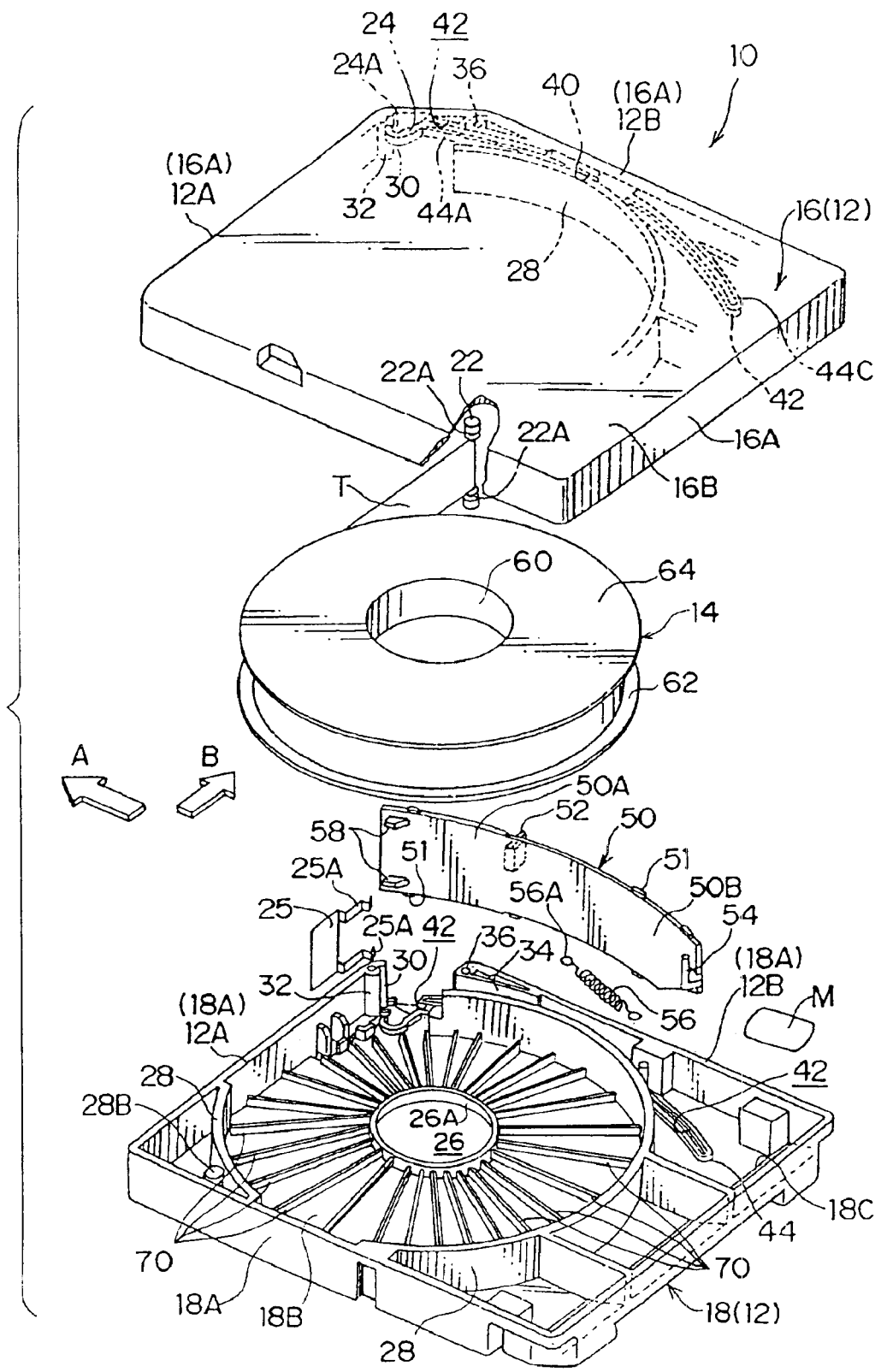
FIG. 2 is an exploded perspective view of the recording tape cartridge of FIG. 1.

In FIG. 1, the overall configuration of the recording tape cartridge 10 is shown in perspective view. In FIG. 2, a schematic exploded perspective view of the recording tape cartridge 10 is shown.

As shown in these figures, the recording tape cartridge 10 includes a case 12, which is substantially rectangular when seen in plan view and within which is rotatably housed a single reel 14. A magnetic tape T, which serves as a recording tape and is a medium for recording and playing back information, is wound around the reel 14. The configuration of the reel will be described later.

The case 12 includes an upper case 16 and a lower case 18. The upper case 16 includes a peripheral wall 16A, and the lower case 18 includes a peripheral wall 18A. A right front corner portion, which is one corner portion at a leading side in the direction in which the recording tape cartridge 10 is loaded into the drive device, of each of the upper case 16 and the lower case 18 is cut out. The peripheral wall 16A and the peripheral wall 18A are brought into contact with each other, whereby the upper case 16 is joined to the lower case 18 to form the case 12. A housing space for the reel 14, around which the magnetic tape T is wound, is disposed inside the case 12. The corner portion from which the peripheral wall 16A of the upper case 16 and the peripheral wall 18A of the lower case 18 have been cut away includes an opening 20 through which the magnetic tape T is pulled out. The detailed configuration of the opening 20 and a door 50 that opens and closes off the opening 20 will be described later.

A leader pin 22, which is caught (engaged) and pulled out by pull-out means of the drive device, is connected to a free end of the magnetic tape T that is pulled out through the opening 20. An annular groove 22A is formed in both end portions of the leader pin 22, which end portions of the leader pin 22 project from width-direction end portions of the magnetic tape T. The annular grooves 22A are caught by hooks or the like of the pull-out means. Thus, when the magnetic tape T is pulled out, the hooks do not contact and damage the magnetic tape T.

A pair of upper and lower pin retainers 24 that position and retain the leader pin 22 inside the case 12 is disposed at an inner side of the opening 20 of the case 12. The pin retainers 24 have semi-cylindrical shapes that open in the direction of arrow B, and both end portions of the leader pin 22 are retained in recess portions 24A in the pin retainers 24 in a state in which the leader pin 22 is vertically disposed therein. The pin retainers 24 are disposed so as to be continuous with ribs 44 described later.

A plate spring 25 is fixed and disposed near the pin retainers 24. The plate spring 25 engages with the upper and lower end portions of the leader pin 22 to retain the leader pin 22 in the pin retainers 24. When the leader pin 22 enters and exits the pin retainers 24, arm portions 25A of the plate spring 25 are appropriately elastically deformed to allow movement of the leader pin 22.

Moreover, a gear opening 26 for exposing a reel gear 66 (described later) of the reel 14 to the outside is disposed in a center portion of the lower case 18. The reel gear 66 of the reel 14 meshes with a drive gear of the drive device, whereby the reel 14 is rotatingly driven inside the case 12. The reel 14 is retained by play regulation walls 28 so that the reel 14 does not chatter. The play regulation walls 28 are disposed so as to project from respective inner surfaces of the upper case 16 and the lower case 18, and serve as an inner wall on portions of a circular locus that is coaxial with the gear opening 26. An annular rib 26A is disposed at an edge portion of the gear opening 26 in the lower case 18 so as to vertically project inside the case 12, and is for positioning the reel 14.

A pocket portion 28A, within which a position-regulating hole is formed, is disposed so as to be continuous with an end portion of the play regulation wall 28 near the opening 20. A pocket portion 28B, in which a position-regulating hole—which is a long hole—is formed, is vertically disposed in a space sandwiched between a left front corner portion of the case 12 and the play regulation wall 28. The pocket portions 28A and 28B are disposed on a straight line along the direction of arrow B. With the exception of the end portion with which the pocket portion 28A is continuously disposed, the end portion of each play regulation wall 28 is continuous with the peripheral wall 16A or the peripheral wall 18A of the case 12, whereby the inside of the case 12 is partitioned between the outer side of the play regulation walls 28 and the space in which the reel 14 is disposed.

A memory board M, in which various information relating to the recording tape cartridge is stored for each recording tape cartridge 10, is disposed at a right rear portion of the lower case 18. Part of an inclined rear wall 18C configuring the peripheral 18A is inclined at a predetermined angle, and the memory board M is disposed at a predetermined angle of inclination, so that detection by the drive device, which reads the memory board M from an undersurface side, and the library device, which reads the memory board M from a back surface side, is possible.

(Configuration of the Opening and the Case near the Opening)

Figure 3:
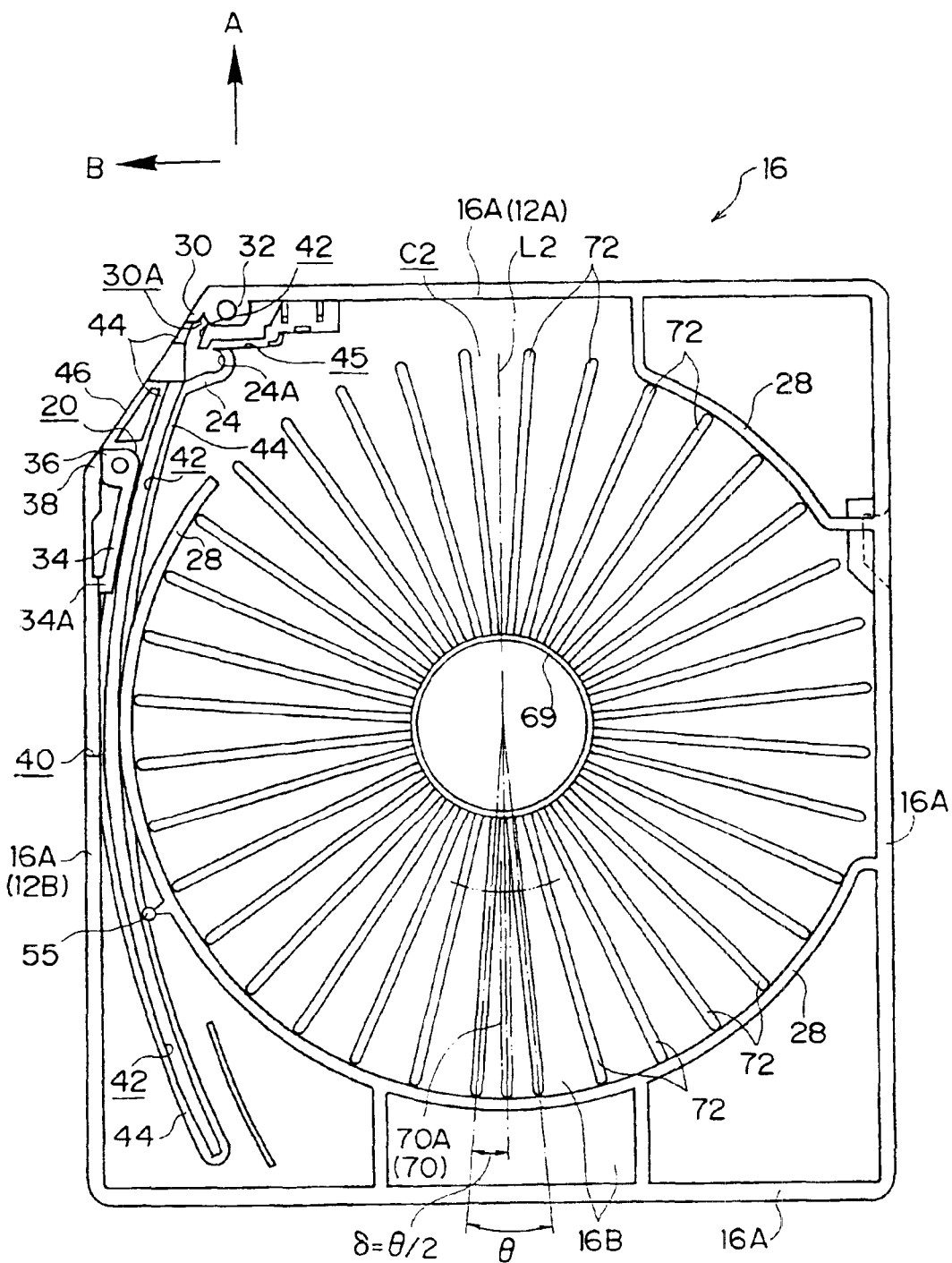
FIG. 3 is a bottom view of an upper case configuring the recording tape cartridge of FIG. 1.
Figure 4:
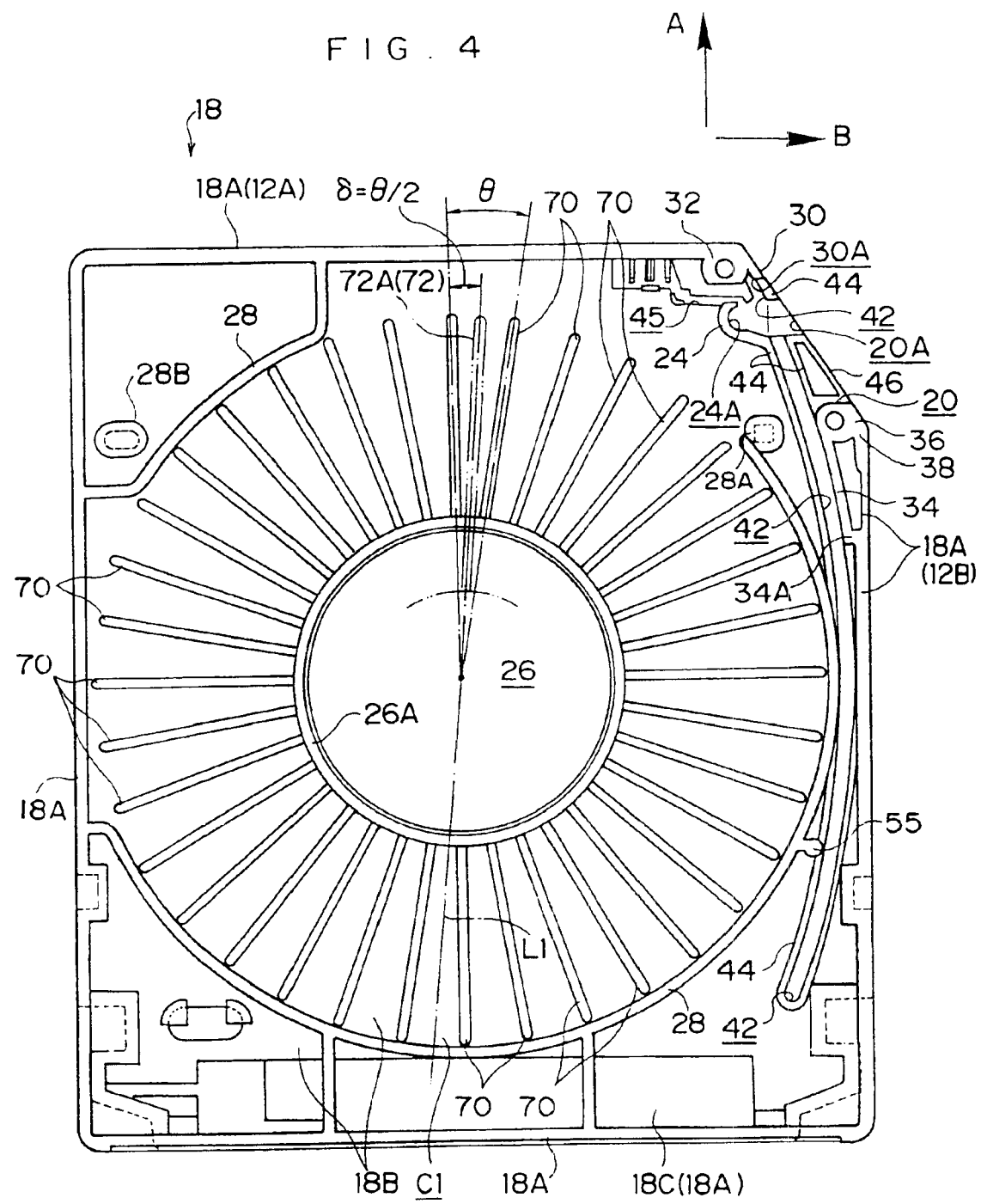
FIG. 4 is a plan view of a lower case configuring the recording tape cartridge of FIG. 1.

As shown in FIG. 3, which is a bottom view of the upper case 16, and FIG. 4, which is a plan view of the lower case 18, respective pairs of upper and lower screw bosses 32 and 36 are disposed at front and rear edge portions of the opening 20. The screw bosses 32 and 36 are, together with other unillustrated screw bosses, used to stop screws for joining together the upper case 16 and the lower case 18.

The screw bosses 32 positioned at the front edge portion of the opening 20 are disposed so as to be respectively continuous with a right end portion of a front wall 12A (portions of the peripheral walls 16A and 18A at which outer surfaces thereof face the direction of arrow A) of the case 12 and a pair of upper and lower dust-prevention walls 30 that are shortly curved along an open surface of the opening 20 from the right end portion of the front wall 12A. Recess portions 30A, into which a leading end portion of the door 50 described later enters, are formed between the screw bosses 32 and the dust-prevention walls 30.

The screw bosses 36 positioned at the rear edge portion of the opening 20 are disposed so as to be respectively continuous with curved walls 38, where a front end portion of a right wall 12B (a right-side wall of the peripheral walls 16A and 18A along the direction of arrow A) of the case 12 is curved substantially along the open surface of the opening 20, and front end portions of a pair of upper and lower arced walls 34 disposed at an inner side of the right wall 12B. The upper and lower arced walls 34 are respectively formed in arcs substantially corresponding to an outer peripheral surface (i.e., a locus of movement) of the door 50 described later when seen in plan view, respectively extend rearward by a predetermined length from the screw bosses 36, and are disposed so that rear portions of the upper and lower arced walls 34 are continuous with the right wall 12B (the peripheral wall 16A and the peripheral wall 18A) via short coupler walls 34A.

A slit 40, which is of a predetermined length and serves as a window portion through which the outside of the case 12 communicates with the inside of the case 12, is disposed in the right wall 12B of the case 12, and an operational protrusion 52 of the door 50 described later is exposed therethrough. The slit 40 is formed by cutting out a lower portion of the peripheral wall 16A configuring the right wall 12B, and also opens frontward due to a lower portion of the curved wall 38 of the upper case 16 being cut out.

Guide grooves 42 for guiding the door 50 are respectively disposed in the upper case 16 and the lower case 18 configuring the case 12. Groove walls of the guide grooves 42 are configured by ribs 44, which are disposed so as to vertically project respectively from a top panel 16B of the upper case 16 and a bottom panel 18B of the lower case 18, the right wall 12B (the peripheral wall 16A and the peripheral wall 18A) and the play regulation walls 28, whereby the guide grooves 42 are formed without thinning the top panel 16B or the bottom panel 18B. The ribs 44 are disposed so as to be continuous with the pin retainers 24.

The guide grooves 42 are formed in arcs along a predetermined circumference extending from the recess 30A, which serves as a base end, to the right rear corner portion of the case 12. The predetermined circumference is determined so that it passes along the outer side of the screw bosses 32, the inner side of the screw bosses 36, and between the right wall 12B and the play regulation walls 28. In the present embodiment, a center position (rotational center of the door 50 described later) of the predetermined circumference is set so that its position (coordinate) in the left-right direction is further outward than the left end of the case 12 and so that its position (coordinate) in the front-rear direction substantially coincides with a rotational center (axial center of the play regulation walls 28) of the reel 14.

Portions of the guide grooves 42 positioned at the opening 20 communicate with the recess portions 24A, due to the ribs 44 being cut out to the right of the pin retainers 24, and also communicate with spring grooves 45 in which the arm portions 25A of the plate spring 25 are disposed. A tapered opening 20A that leads the leader pin 22 inside the case 12 communicates with the recess portions 24A of the pin retainers 24 at the cutout portions of the guide grooves 42. Moreover, ribs 46, which are respectively formed along a rear edge of the tapered opening 20A, front edges of the screw bosses 36 and the open surface of the opening 20, are disposed so as to be continuous with the ribs 44, whereby the strength around the opening 20 of the case 12 is secured and improved.

Moreover, rear ends of the ribs 44 configuring the rear half portion of the guide grooves 42 are closed substantial "U" shapes. The ribs 44 of the upper case 16 are formed so that they are rearwardly longer than the ribs 44 of the lower case 18. The reason for this is because the inclined rear wall 18C (peripheral wall 18A) of the lower case 18 is a surface inclined at a predetermined angle so that the door 50 is not made to interfere with the memory board M disposed at the right wall 12B.

Moreover, a pair of upper and lower spring catch pins 55 is disposed at longitudinal center portions at inner side portions of the rear half portion ribs 44. The spring catch pins 55 are respectively disposed so as to be continuous with the play regulation walls 28, and the spring catch pin 55 of the lower case 18 is formed so as to be longer than the spring catch pin 55 of the upper case 16. An annular portion 56A at one end of a coil spring 56 described later is hooked on a portion of the spring catch pins 55 that project further upward than the play regulation walls 28. The short spring catch pin 55 of the upper case 16 is brought into contact with the spring catch pin 55 of the lower case 18, whereby the coil spring 56 is prevented from coming off.

In a state where the peripheral walls 16A and 18A are brought into contact with each other, the above-described upper case 16 and the lower case 18 are fixed (joined) by unillustrated screws being screwed from the underside into the screw bosses 32 and 36 and other screw bosses, to thereby configure the case 12. Because the opening 20 is formed by cutting out the right front corner portion, the open surface of the opening 20 faces the direction of arrow A and the direction of arrow B, whereby the pull-out means of the drive device can access the opening 20 from the direction of arrow A, the direction of arrow B, or from between the direction of arrow A and the direction of arrow B, and chuck the leader pin 22. Thus, the area in which the pin retainers 24 that retain the leader pin 22 can be disposed is widened, and the region in which the pull-out means of the drive device can chuck the leader pin 22 is sufficiently wide, whereby it is possible to set the disposed positions of the pin retainers 24 to match the specification of the drive device that chucks the leader pin 22 from the direction of arrow A or the direction of arrow B. For this reason, the degree of freedom with which the drive device is designed is also increased.

(Configuration of the Door)

The above-described opening 20 in the case 12 is opened and closed off by the door 50, which serves as a shielding member. The door 50 is curved in a plate thickness direction and formed in an arced shape whose radius of curvature in plan view coincides with the radius of curvature of the guide grooves 42 (predetermined circumference). A front portion (at least a portion blocking the opening 20) of the door 50 has plate width (height) which is substantially the same as the height of the opening 20 and serves as a closing portion 50A. A portion of the door 50 whose plate width further rearward than the closing portion 50A is made slightly smaller than the remaining portion serves as a drive portion 50B.

Figure 5A:
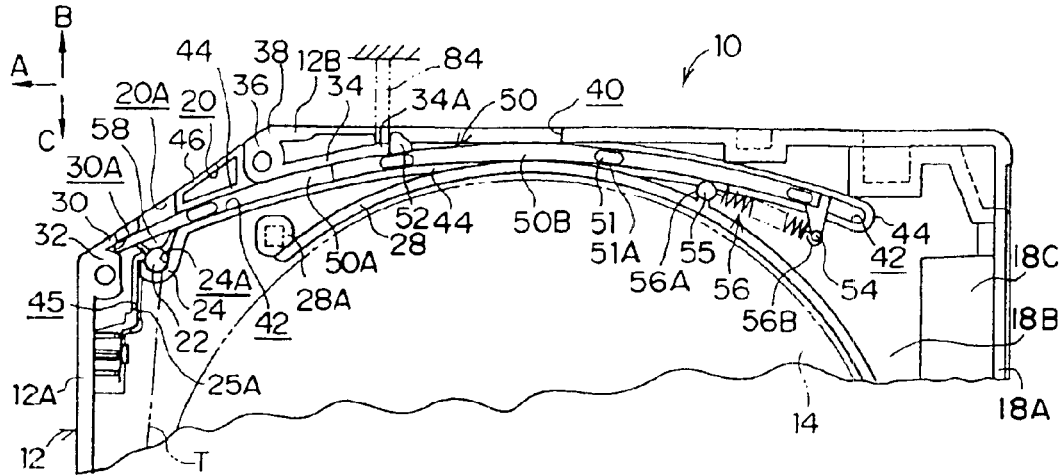
FIGS. 5A to 5C are drawings showing an opening process of an opening in the recording tape cartridge in a state where the upper case has been removed, with FIG. 5A being a plan view showing an initial state of engagement between an operational protrusion of a door and an engagement protrusion of a drive device, FIG. 5B being a plan view showing the opening halfway open, and FIG. 5C being a plan view showing a state where the opening is completely open.
Figure 5B:
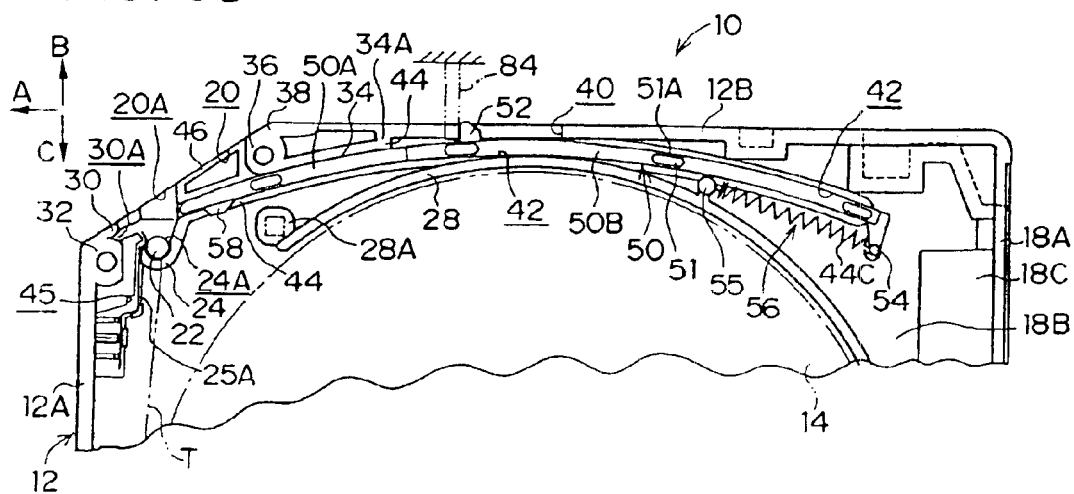

The plate length (curved longitudinal dimension) of the door 50 is determined so that a rear end portion of the drive portion 50B is positioned inside the right rear corner portion of the case 12 in a state where the opening 20 is closed off (see FIG. 5A). It should be noted that a rear lower portion of the drive portion 50B is diagonally cut out in order to avoid the memory board M disposed at the inclined surface of the inclined rear wall 18C of the lower case 18.

Figure 5C:
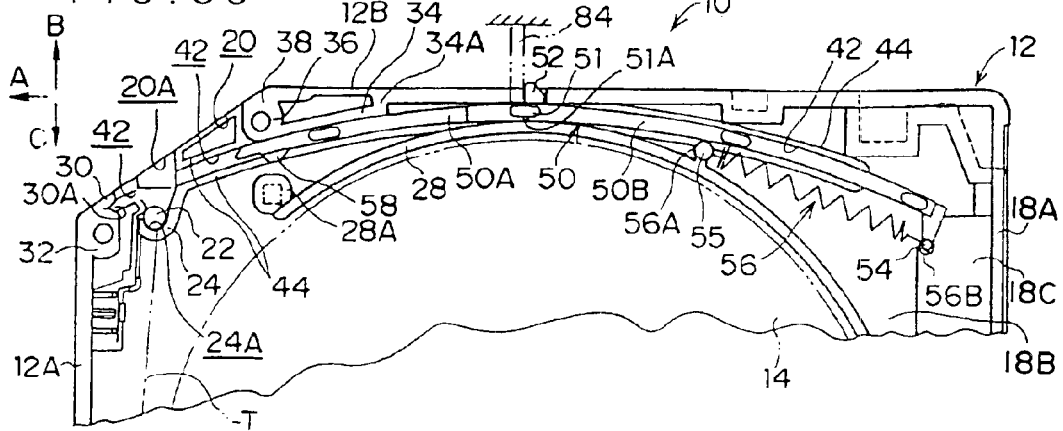

The door 50 closes off the opening 20 in a state where the leading end portion of the closing portion 50A has been inserted into the recess portions 30A positioned at the outer side of the screw bosses 32 (FIG. 5A), opens the opening 20 by moving (rotating) substantially rearward along the guide grooves 42 (FIG. 5B), and completely opens the opening 20 when the outer peripheral surface near the leading end of the closing portion 50A reaches the inner-side vicinity of the screw bosses 36 (FIG. 5C). The door 50 closes off the opening 20 by rotating in the direction substantially opposite to the direction in which it rotates when opening the opening 20.

In this manner, the door 50 is curved so as to be rotated to open and close off the opening 20 without sticking out from the predetermined circumference that is the locus of its movement. The rotational center and radius (shape of the guide grooves 42) of the door 50 may be appropriately determined in response to the positions of the front and rear edge portions (screw bosses 32 and 36) of the opening 20 determined by the demand from the drive device and the angle of the open surface of the opening 20 determined by the demand from a library device.

Plural protruding portions 51, which respectively enter the upper and lower guide grooves 42, are disposed so as to project from upper and lower ends of the door 50. The height to which the protruding portions 51 project differs between the closing portion 50A and the drive portion 50B, but the distance from a width-direction centerline (along the longitudinal direction) of the door 50 to the top portions of the protruding portions 51 is constant. Thus, the protruding portions 51 slide against the top panel 16B and the bottom panel 18B, which are bottom portions of the guide grooves 42.

Protrusions 51A, top portions of which are along plate-thickness-direction end surfaces of the door 50, are disposed so as to project from both sides of the protruding portions 51 in the plate thickness direction of the door 50. The protrusions 51 slide against the groove walls (ribs 44, etc.) of the guide grooves 42. It should be noted that the foremost-positioned protruding portions 51 are disposed so as not to enter the tapered opening 20A communicating with the guide grooves 42 during the opening and closing process of the opening 20.

Due to the protruding portions 51 and the protrusions 51A, the door 50 is guided along the guide grooves 42 at the time the door 50 opens and closes off the opening 20, and reliably rotates so that it moves along the outer side of the screw bosses 32, along the inner side of the screw bosses 36, and between right wall 12B and the play regulation walls 28, without sticking out from the locus of movement.

The operational protrusion 52, which serves as an operational portion, is disposed along a radial direction of the door 50 so as to protrude from an outer peripheral portion of the door 50 near a front end (closing portion 50A side) of the drive portion 50B. The operational protrusion 52 is exposed to the outside of the case 12 through the slit 40 and engages with an engagement protrusion 84 that enters through a portion opening at the front of the slit 40 in accompaniment with the loading of the recording tape cartridge 10 into the drive device, whereby the door 50 is moved in the direction in which the opening 20 is opened.

A substantially "L" shaped spring catch portion 54 is disposed at a rear end portion of the drive portion 50B of the door 50 so as to project inward from the door 50. An upper side of the spring catch portion 54 serves as a free end. The coil spring 56 serving as urging means is locked and retained at the spring catch portion 54. Specifically, annular portions 56A and 56B for being hooked are respectively disposed at end portions of the coil spring 56. The spring catch pins 55 of the case 12 are passed through the annular portion 56A so that the annular portion 56A is caught and retained at the case 12, and the spring catch portion 54 is passed through the annular portion 56B so that the annular portion 56B is caught and retained at the door 50.

Thus, the door 50 is urged in the closing direction of the opening 20 by the urging force of the coil spring 56 to close off the opening 20 in an ordinary state. Additionally, because the door 50 has a length that spans the right rear corner portion of the case 12 in a state where the opening 20 is closed off, the coil spring 56 is disposed to effectively use the space between the play regulation walls 28 and the peripheral walls 16A and 18A (inclined rear wall 18C) in the right rear corner portion.

Stoppers 58, which abut against a side surface of the upper end portion and a side surface of the lower end portion of the leader pin 22 when the opening 20 is closed off, are disposed so as to project from the inner surface of the closing portion 50A of the door 50, and can reliably prevent the leader pin 22 from falling out of the pin retainers 24 due to impact when the case 12 is dropped.

The operational protrusion 52 engages with the engagement protrusion 84 (see FIGS. 5A to 5C) of the drive device due to the action in which the recording tape cartridge 10 is loaded into the drive device, whereby the door 50 moves with respect to the case 12 counter to the urging force of the coil spring 56 and opens the opening 20. When the recording tape cartridge 10 is ejected from the drive device, the door 50 closes off the opening 20 due to the urging force of the coil spring 56.

The door 50, which is formed so as to curve in an arc, is rotated so that it moves around the outer side of the reel 14 and the pin retainers 24 (leader pin 22) without sticking out from the locus of movement along the curved shape thereof, and opens and closes off the opening 20 inclined with respect to the direction of arrow A. The door 50 does not stick out from the outer contour region of the case 12 when opening and closing off the opening 20.

(Configuration of the Reel and Ribs)

As shown in FIGS. 6A and 6B, the reel 14 is provided with a substantially bottomed cylindrical reel hub 60 that includes a cylindrical portion 60A, whose outer peripheral surface is wound with the magnetic tape T, and a bottom portion 60B, which closes off a lower portion of the cylindrical portion 60A. A lower flange 62 is integrally and coaxially disposed at an end portion (lower end portion) of the bottom portion 60B of the reel hub 60 so as to extend outward in the radial direction from the end portion of the bottom portion 60B. An upper flange 64, whose inner diameter is substantially the same as the inner diameter of the cylindrical portion 60A and whose outer diameter is substantially the same as the outer diameter of the lower flange 62, is coaxially joined to an upper end portion of the reel hub 60 by ultrasonic welding or the like.

Thus, the magnetic tape T is wound around the outer peripheral surface of the cylindrical portion 60A of the reel hub 60 of the reel 14 between opposing surfaces of the lower flange 62 and the upper flange 64, and the cylindrical portion 60A opens upward. The outer diameters of the lower flange 62 and the upper flange 64 are slightly smaller than the inner diameter of the play regulation walls 28 of the case 12, and the reel 14 is rotatable inside the case 12.

A reel gear 66 for rotatingly driving the reel 14 is annularly disposed at the bottom portion 60B of the reel hub 60. The reel gear 66 is formed so that it can mesh with a drive gear 82 disposed at a tip end of a rotating shaft 80 of the drive device. Moreover, an annular groove 68 corresponding to the annular rib 26A of the lower case 18 is disposed at an outer side of the reel gear 66 at the bottom portion 60B.

The above-described reel 14 is movable in the axial direction (vertical direction) inside the case 12. The reel 14 is pushed towards the lower case 18 by an urging force of an unillustrated compression coil spring—which is urging means—disposed between the reel 14 and the upper case 16. As shown in FIG. 6A, the annular rib 26A of the lower case 18 is fitted in (made to abut against the inside of) the annular groove 68 to thereby position the reel 14 with respect to the case 12. In this state, the reel gear 66 is exposed through the gear opening 26 of the lower case 18. Also, in this state, the reel 14 is locked by unillustrated locking means so as to not be rotatable.

An annular rib 69 for retaining an end of the compression coil spring is disposed so as to vertically project from the inner surface of the top panel 16B of the upper case 16. The annular rib 69 is coaxial with the annular rib 26A (i.e., the reel 14) and has a smaller diameter than that of the annular rib 26A.

As shown in FIG. 6B, when the recording tape cartridge 10 is loaded into the drive device, the drive gear 82 of the drive device entering the case 12 through the gear opening 26 is made to mesh with the reel gear 66 of the reel 14. Then, the reel 14 rises with respect to the case 12 (inside the case 12) in accompaniment with this meshing operation and the locked state of the reel 14 resulting from the locking means is released.

Thus, the reel 14 does not contact the inner surfaces of the case 12 and is rotatable. The rotational shaft 80 including the drive gear 82 meshing with the reel gear 66 is rotatingly driven, whereby the reel 14 rotates around the axial line thereof inside the case 12.

Lower ribs 70 and upper ribs 72 for suppressing inclination of the reel 14 inside the case 12 are disposed in the case 12.

As shown in FIG. 4, the lower ribs 70 are plurally disposed so as to vertically project from the inner surface of the bottom panel 18B of the lower case 18, which is a surface opposing the lower flange 62 of the reel 14. The plural lower ribs 70 are disposed in a radial manner coaxial with the annular rib 26A (i.e., the reel 14) and at equal intervals. That is, an angle formed between adjacent lower ribs 70 is constant. The number of lower ribs 70 is an even number and, in the present embodiment, is 36. That is, the lower ribs 70 are disposed every 10° (=θ).

A base end of each lower rib 70 is joined to the annular rib 26A and a terminal end of each lower rib 70 is joined to the play regulation walls 28 or is on a virtual extension line of the play regulation walls 28. That is, the length of each lower rib 70 is a length where the radius of the annular rib 26A is subtracted from the radius of the play regulation walls 28. The heights of the lower ribs 70 are lower than the height of the annular rib 26A (see FIG. 2), are mutually equal, and are substantially constant across the longitudinal direction (radial direction of the reel 14).

As shown in FIG. 3, the upper ribs 72 of the same number of the lower ribs 70 are disposed so as to vertically project from the inner surface of the top panel 16B of the upper case 16, which is a surface opposing the upper flange 64 of the reel 14. The plural upper ribs 72 are disposed in a radial manner coaxial with the annular rib 69 (i.e., the reel 14) and at equal intervals. That is, an angle formed between adjacent upper ribs 72 is constant. In the present embodiment, 36 upper ribs 72 are disposed every 10° (=θ).

A base end of each upper rib 72 is joined to the annular rib 69 and a terminal end of each upper rib 72 is joined to the play regulation walls 28 or is on a virtual extension line of the play regulation walls 28. That is, the length of each upper rib 72 is a length where the radius of the annular rib 69 is subtracted from the radius of the play regulation walls 28. A virtual circle formed by joining the terminal ends (outer end portions in the radial direction) of the upper ribs 72 coincides with a virtual circle formed by joining the terminal ends of the lower ribs 70 when seen in plan view. The heights of the upper ribs 70 are mutually equal and substantially constant across the longitudinal direction (radial direction of the reel 14).

The lower ribs 70 and the upper ribs 72 having the above-described radial-direction dimensions (lengths) respectively correspond to the substantially entire surfaces of the lower flange 62 and the upper flange 64. Therefore, if there are cases where constriction arises due to the winding pressure of the magnetic tape T wound around the reel hub 60 and the upper and lower flanges 64 and 62 approach each other at the outer side of the radial direction and thus the upper and lower flanges 64 and 62 fail to contact the upper ribs 72 and the lower ribs 70 at their respective outer peripheral portions, the reel 14 is reliably held, when the reel is inclined, by at least some of the upper and lower ribs 70, 72.

The above-described lower ribs 70 and upper ribs 72 are disposed so that, when the upper case 16 and the lower case 18 are joined together, they have a circumferential-direction phase difference therebetween. The phase difference is set to half the angle formed between adjacent lower ribs 70 or adjacent upper ribs 72 (δ=θ/2). Thus, in plan view, the upper ribs 72 are positioned between adjacent lower ribs 70 and the lower ribs 70 are positioned between adjacent upper ribs 72.

Next, the action of the present embodiment will be described.

In the recording tape cartridge 10 of the above-described configuration, the leading edge portion of the door 50 is inserted into the recess 30A by the urging force of the coil spring 56 so that the door 50 closes off the opening 20 when the recording tape cartridge 10 is not in use (during storage or transport). As shown in FIG. 6A, in a state where the reel gear 66 is exposed through the gear opening 26, the reel 14 is pushed towards the lower case 18 by the compression coil spring and the annular rib 26A is fitted into (made to abut against) the annular groove 68, whereby the reel 14 is positioned. Moreover, in this state, the reel 14 is locked by the locking means so as to not be rotatable.

When the magnetic tape T is to be used, the recording tape cartridge 10 is loaded into a bucket (not shown) of the drive device along the direction of arrow A. The engagement protrusion 84 of the drive device engages with the operational protrusion 52 of the door 50 in accompaniment with this loading, whereby the door 50 is rotated substantially rearward and the opening 20 is opened.

When the recording tape cartridge 10 is loaded to a predetermined depth in the bucket, the bucket drops and the rotating shaft 80 of the drive device relatively moves toward the gear opening 26 of the case 12. As shown in FIG. 6B, the rotating shaft 80 causes the drive gear 82 to mesh with the reel gear 66 due to the aforementioned movement in the approaching direction and the reel 14 is made to rise with respect to the case 12 counter to the urging force of the compression coil spring.

Due to this operation, the recording tape cartridge 10 is positioned inside the drive device, the locked state of the reel 14 resulting from the locking means is released, and the reel 14 can rotate inside the case 12 without contacting the inner surfaces of the case 12.

From this state, the pull-out means of the drive device pulls out the leader pin 22 through the opened opening 20 and accommodates the leader pin 22 at a take-up reel of the drive device. Then, when the drive device synchronously rotatingly drives the take-up reel and the reel 14 (rotating shaft 80), the magnetic tape T is successively pulled out from the case 12 and taken up at the take-up reel, and information is recorded or played back by a recording/playback head disposed along a predetermined tape path.

When the magnetic tape T is rewound around the reel 14 and the bucket rises, the rotating shaft 80 moves away from the reel 14 and the reel 14 is returned to its initial state by the urging force of the compression coil spring. That is, the reel 14 drops with respect to the case 12 so that the annular rib 26A is fitted inside the annular groove 68, whereby the reel 14 is positioned and locked by the locking means so as to not be rotatable.

When the recording tape cartridge 10 is to be ejected from the bucket, the recording tape cartridge 10 is moved in the direction opposite to the direction of arrow A by the urging force of the coil spring 56 or an unillustrated ejecting mechanism. In accompaniment with this movement, the door 50 is made to close off the opening 20 by the urging force of the coil spring 56. Thus, the recording tape cartridge 10 is ejected from the drive device and returned to its initial state.

As described above, the reel 14 is movable inside the case 12 in the axial direction (vertical direction). Thus, for example, when the user mistakenly pushes the bottom portion 60B of the reel 14 exposed through the gear opening or drops the recording tape cartridge 10, the reel 14 becomes inclined inside the case 12. In this instance, the lower flange 62 and the upper flange 64 of the reel 14 respectively abut against the lower ribs 70 and the upper ribs 72.

Here, because the lower ribs 70 and the upper ribs 72, of mutually the same numbers, are disposed in a radial manner respectively coaxial with the lower flange 62 and the upper flange 64 (reel 14) and have the circumferential-direction phase difference therebetween, inclination (angle of inclination) of the reel 14, in which one radial-direction end approaches the inner surface of the top panel 16B of the upper case 16 and the other end approaches the inner surface of the bottom panel 18B of the lower case 18, can be effectively suppressed.

That is, in the recording tape cartridge 10 where the upper ribs 72 are positioned between adjacent lower ribs 70 in plan view, even if an attempt is made to make the lower flange 62 enter a gap C1 between adjacent lower ribs 70 so that the reel 14 becomes largely inclined, the upper ribs 72A (see FIG. 4) are positioned at the 180° opposite side in the radial direction and abut against the upper flange 64, whereby inclination (angle of inclination) of the reel 14 is effectively suppressed. Conversely, even if an attempt is made to make the upper flange 64 enter a gap C2 between adjacent upper ribs 72 so that the reel 14 becomes largely inclined, the lower ribs 70A (see FIG. 3) are positioned at the 180° opposite side in the radial direction and abut against with the lower flange 62, whereby inclination (angle of inclination) of the reel 14 is effectively suppressed.

In other words, the recording tape cartridge 10 is configured to be substantially equivalent to a configuration where the upper ribs 72 are added between adjacent lower ribs 70 and the lower ribs 70 are added between adjacent upper ribs 72, so that inclination of the reel 14 is effectively suppressed. Alternatively, by employing the same concept, the recording tape cartridge 10 may be configured to reduce the number of disposed lower ribs 70 and upper ribs 72 as many as possible and keep an acceptable maximum inclination of the reel 14.

Particularly because the phase difference between the lower ribs 70 and the upper ribs 72 is half the angle formed between the lower ribs 70 (between the upper ribs 72), the recording tape cartridge 10 is configured to be substantially equivalent to a configuration where the upper ribs 72 are added between adjacent lower ribs 70 at equal intervals from the respective lower ribs 70 and the lower ribs 70 are added between adjacent upper ribs 72 at equal intervals from the respective upper ribs 72 so that, regardless of the direction of inclination of the reel 14, the angle of inclination of the reel 14 is even more effectively suppressed. Because the same numbers of lower ribs 70 and upper ribs 72 are disposed and the numbers are even numbers, the upper ribs 72 are positioned at the 180° opposite side along a centerline L1 (see FIG. 4) along the radial direction of the gap C1 between adjacent lower ribs 70 and the lower ribs are positioned at the 180° opposite side along a centerline L2 (see FIG. 3) along the radial direction of the gap C2 between adjacent upper ribs 72. Thus, inclination of the reel 14 can be even more effectively suppressed.

In this manner, in the recording tape cartridge 10 pertaining to the embodiment, inclination of the reel 14 can be suppressed by the lower ribs 70 and the upper ribs 72 vertically disposed inside the case 12. Additionally, because inclination of the reel 14 is effectively suppressed, the width-direction end portions (edges) of the magnetic tape T, whose leading end is connected to the leader pin 22 positioned with respect to the case 12 in the pin retainers 24 and which moves with respect to the reel 14 inclined inside the case 12, are prevented or suppressed from contacting the lower flange 62 and the upper flange 64, so that the magnetic tape T is protected.

It should be noted that, although 36 lower ribs 70 and 36 upper ribs 72 are disposed in the above-described embodiment, the invention is not limited thereto. It suffices as long as the same numbers (plural) of lower ribs 70 and upper ribs 72 are disposed in a radial manner coaxial with the reel 14, at equal intervals, and with a phase difference. Thus, for example, the numbers of lower ribs 70 and upper ribs 72 may be odd numbers and the phase difference does not have to be half the angle Also, although the recording tape cartridge 10 of the above-described embodiment is a so-called single reel recording tape cartridge accommodating the single reel 14 inside the case 12, the invention is not limited thereto. For example, the lower ribs 70 and the upper ribs 72 may also be disposed in a case configuring a two-reel recording tape cartridge accommodating two reels 14—one for winding off and one for taking up the magnetic tape.

Moreover, although the magnetic tape T is used as the recording tape in the above-described embodiment, the invention is not limited thereto. It suffices as long as the recording tape is a long tape-form information recording and playback medium with which recording of information and playback of recorded information is possible. It goes without saying that the recording tape cartridge pertaining to the invention is applicable to recording tapes of all recording and playback formats.

As described above, the recording tape cartridge pertaining to the invention has the excellent effect that inclination of a reel can be suppressed by ribs vertically disposed inside a case.

What is claimed is:

1. A recording tape cartridge comprising:
   a case formed by joining together an upper case and a lower case;
   a reel that includes flanges respectively disposed at both axial-direction end portions of a reel hub wound with a recording tape, the reel being housed in the case and rising and being rotated inside the case when the recording tape cartridge is used;
   plural upper ribs disposed, in a radial manner coaxial with the flanges and at substantially equal intervals, so as to vertically project from a surface of the upper case opposing the flanges; and
   lower ribs disposed, in a radial manner coaxial with the flanges and at substantially equal intervals, so as to vertically project from a surface of the lower case opposing the flanges, with the number of lower ribs being equal to the number of upper ribs,
   wherein, when the upper case and the lower case are joined together, the upper ribs and the lower ribs have a phase difference therebetween in a circumferential direction.

2. The recording tape cartridge of claim 1, wherein the heights of the upper ribs are mutually equal and substantially constant across a longitudinal direction of the upper ribs, i.e., a radial direction of the reel.

3. The recording tape cartridge of claim 1, wherein a virtual circle joining radial-direction outer end portions of the upper ribs coincides with a virtual circle joining radial-direction end portions of the lower ribs in plan view.

4. The recording tape cartridge of claim 1, further comprising
   an opening for exposing part of the reel to the outside, the opening being formed in a center portion of the lower case, and
   play regulation walls for regulating play of the reel, the play regulation walls being formed at inner surfaces of the upper case and the lower case as an inner wall on a circular locus coaxial with the opening.

5. The recording tape cartridge of claim 4, wherein each lower rib extends from the opening to the play regulation walls or to a virtual extension line of the play regulation walls in plan view.

6. The recording tape cartridge of claim 4, wherein each upper rib extends from the reel hub to the play regulation walls or to a virtual extension line of the play regulation walls in plan view.

7. The recording tape cartridge of claim 1, wherein the heights of the lower ribs are mutually equal and substantially constant across a longitudinal direction of the lower ribs, i.e., a radial direction of the reel.

8. The recording tape cartridge of claim 1, wherein the phase difference is half an angle formed between adjacent lower ribs.

9. The recording tape cartridge of claim 2, wherein the number of upper ribs and the number of lower ribs are even numbers.

10. The recording tape cartridge of claim 9, wherein the upper ribs are positioned in the middle of adjacent lower ribs and the lower ribs are positioned in the middle of adjacent upper ribs in plan view.

11. A recording tape cartridge comprising:
- a case formed by joining together an upper case and a lower case;
- a reel that includes upper and lower flanges respectively disposed at both axial-direction end portions of a reel hub wound with a recording tape, the reel being configured so as to be rotatable inside the case;
- plural upper ribs disposed, in a radial manner coaxial with the upper flange and at substantially equal intervals, so as to vertically project from a surface of the upper case opposing the upper flange; and
- lower ribs disposed, in a radial manner coaxial with the lower flange and at substantially equal intervals, so as to vertically project from a surface of the lower case opposing the lower flange, with the number of lower ribs being equal to the number of upper ribs,
- wherein the upper ribs are positioned between adjacent lower ribs and the lower ribs are positioned between adjacent upper ribs in plan view.

12. The recording tape cartridge of claim 11, wherein, when the upper case and the lower case are joined together, the upper ribs and the lower ribs have a mutual phase difference therebetween in a circumferential direction.

13. The recording tape cartridge of claim 12, wherein the phase difference is half an angle formed between adjacent lower ribs.

14. The recording tape cartridge of claim 13, wherein the number of upper ribs and the number of lower ribs are even numbers.

15. The recording tape cartridge of claim 14, wherein the upper ribs are positioned in the middle of adjacent lower ribs and the lower ribs are positioned in the middle of adjacent upper ribs in plan view.

16. The recording tape cartridge of claim 11, further comprising
- an opening for exposing part of the reel to the outside, the opening being formed in a center portion of the lower case, and
- play regulation walls for regulating play of the reel, the play regulation walls being formed at inner surfaces of the upper case and the lower case as an inner wall on a circular locus coaxial with the opening.

17. The recording tape cartridge of claim 16, wherein each lower rib extends from the opening to the play regulation walls or to a virtual extension line of the play regulation walls in plan view.

18. The recording tape cartridge of claim 16, wherein each upper rib extends from the reel hub to the play regulation walls or to a virtual extension line of the play regulation walls in plan view.

19. The recording tape cartridge of claim 11, wherein a virtual circle joining radial-direction outer end portions of the upper ribs coincides with a virtual circle joining radial-direction end portions of the lower ribs in plan view.

* * * * *